United States Patent
Masui et al.

(10) Patent No.: US 11,377,995 B2
(45) Date of Patent: Jul. 5, 2022

(54) CATALYST UNIT AND EXHAUST STRUCTURE OF ENGINE INCLUDING SAME

(71) Applicants: KAWASAKI JUKOGYO KABUSHIKI KAISHA, Kobe (JP); NICHIDAI FILTER CORPORATION, Kyoto (JP); SHINBA IRON WORKS CORPORATION, Kakegawa (JP)

(72) Inventors: Kazuki Masui, Grand Rapids, MI (US); Takaharu Minami, Tsuzuki-gun (JP); Tadashi Kato, Tsuzuki-gun (JP); Hideki Takatsuka, Kakegawa (JP); Noboru Ishizawa, Kakegawa (JP)

(73) Assignees: Kawasaki Jukogyo Kabushiki Kaisha; Nichidai Filter Corporation; Shinba Iron Works Corporation

( * ) Notice: Subject to any disclaimer, the term of this patent is extended or adjusted under 35 U.S.C. 154(b) by 0 days.

(21) Appl. No.: 17/098,127

(22) Filed: Nov. 13, 2020

(65) Prior Publication Data
US 2021/0148272 A1  May 20, 2021

(30) Foreign Application Priority Data
Nov. 19, 2019 (JP) .............. JP2019-208506

(51) Int. Cl.
*F01N 3/34* (2006.01)
*F01N 13/10* (2010.01)
(Continued)

(52) U.S. Cl.
CPC ............... *F01N 3/34* (2013.01); *F01N 13/10* (2013.01); *B01D 53/9495* (2013.01);
(Continued)

(58) Field of Classification Search
CPC ........ F01N 3/34; F01N 13/001; F01N 13/105; F01N 13/1833; F01N 2590/06
See application file for complete search history.

(56) References Cited

U.S. PATENT DOCUMENTS 4,499,724 A * 2/1985 Ikenoya .................. F01N 3/222
60/290
5,433,073 A * 7/1995 Duret ..................... F01N 3/2053
60/288
(Continued)

FOREIGN PATENT DOCUMENTS

| DE | 102012022679 A1 * | 5/2014 | ............ F01N 3/021 |
| JP | 2001-355440 | 12/2001 | |
| WO | WO-2015059904 A1 * | 4/2015 | ........... F01N 3/0835 |
| WO | WO-2019168017 A1 * | 9/2019 | ............... F01N 3/28 |

OTHER PUBLICATIONS

Machine translation of DE-102012022679-A1, accessed Jun. 16, 2020. (Year: 2020).*
(Continued)

*Primary Examiner* — Jonathan R Matthias (57) ABSTRACT

A muffler is detachably attached to an engine. A catalyst for purifying exhaust gas is provided upstream of the muffler, and a secondary air valve for supplying air to an exhaust passage is provided upstream of the catalyst. The catalyst and the secondary air valve are integrally unitized. A catalyst unit including the catalyst and the secondary air valve is provided between the engine and the muffler.

17 Claims, 4 Drawing Sheets

(51) Int. Cl.
    *F01N 3/22*          (2006.01)
    *F01N 3/28*          (2006.01)
    *F01N 1/00*          (2006.01)
    *B01D 53/94*        (2006.01)
    *F01N 13/00*        (2010.01)

(52) U.S. Cl.
    CPC .......... *B01D 2255/902* (2013.01); *F01N 1/00* (2013.01); *F01N 3/22* (2013.01); *F01N 3/2803* (2013.01); *F01N 3/2892* (2013.01); *F01N 13/008* (2013.01); *F01N 2330/02* (2013.01); *F01N 2330/12* (2013.01); *F01N 2590/06* (2013.01)

(56) References Cited

U.S. PATENT DOCUMENTS

| | | | | |
|---|---|---|---|---|
| 6,062,020 | A * | 5/2000 | Blanchet | F01N 13/10 60/302 |
| 2009/0282819 | A1 * | 11/2009 | Kashima | F02D 13/0273 60/317 |
| 2010/0180583 | A1 * | 7/2010 | Takahashi | F02B 27/04 60/312 |

OTHER PUBLICATIONS

Machine translation of WO-2015059904-A1, accessed Jun. 16, 2020. (Year: 2020).*

Machine translation of WO-2019168017-A1, accessed Dec. 20, 2021. (Year: 2021).*

\* cited by examiner

FRONT ← → REAR

CATALYST UNIT AND EXHAUST STRUCTURE OF ENGINE INCLUDING SAME

CROSS REFERENCE TO THE RELATED APPLICATION

This application is based on and claims Convention priority to Japanese patent application No. 2019-208506, filed Nov. 19, 2019, the entire disclosure of which is herein incorporated by reference as a part of this application.

BACKGROUND OF THE INVENTION

Field of the Invention

The present invention relates to a catalyst unit mounted to an engine to which a muffler is detachably attached, for example, and an exhaust structure of the engine including the catalyst unit.

Description of Related Art

For example, in the case of mounting an engine to a working machine such as a ride-on-type lawn mower, the manufacturers for the working machine and the engine can be different with each other. That is, the manufacturer for the engine provides the engine to the manufacturer for the working machine, and the manufacturer for the working machine mounts the engine to the working machine. In such a case, the manufacturer for the working machine often prepares an exhaust muffler, and therefore, a certain degree of freedom is required in the specifications of mufflers that can be mounted to the engine (for example, JP Laid-open Patent Publication No. 2001-355440).

With strict exhaust gas regulations in recent years, it has become necessary to mount a catalyst and a secondary air valve to an exhaust system. The effect of the catalyst and the secondary air valve differs depending on the mounting positions thereof. Therefore, the degree of freedom in muffler specifications for the manufacturer for the working machine is limited. In addition, the catalyst needs to be assured by the manufacturer for the engine. Therefore, if the mounting position thereof is changed, consideration is needed each time, and thus, a labor and cost arise for the consideration by the manufacturer for the engine.

DISCLOSURE OF THE INVENTION

An object of the present invention is to provide a catalyst unit and an exhaust structure of an engine including such a catalyst unit that enable improvement in the degree of freedom in designing of a muffler.

In order to attain the above object, a catalyst unit according to the present invention includes: a pipe member forming an exhaust passage from an engine; a catalyst which is provided in the pipe member and purifies exhaust gas; an air mixing chamber which is formed upstream of the catalyst in the pipe member and in which the exhaust gas and outside air are mixed; and an air supply portion which is provided to the pipe member and supplies the outside air to the air mixing chamber. The air supply portion may be a secondary air valve, for example. The catalyst may a multilayer metal mesh catalyst, for example. The pipe member may be provided upstream of the muffler, for example.

In this configuration, the catalyst and the air mixing chamber on the upstream side thereof are provided in the pipe member, and the air supply portion is provided to the pipe member, thus forming a subassembly. As described above, since the catalyst unit including the catalyst and the air supply portion forms a subassembly, attachment thereof to the engine is facilitated. In addition, in the case where such a catalyst unit is attached between the engine and the muffler, it is possible to consider the catalyst and the secondary air valve (air supply portion) irrespective of the arrangement of the muffler. Thus, consideration for the catalyst and the secondary air valve (air supply portion) becomes easy for the manufacturer for the engine. In addition, the manufacturer for the working machine can arrange the muffler without considering arrangements of the catalyst and the secondary air valve (air supply portion), and therefore, the degree of freedom in muffler specifications is improved.

In the present invention, of the catalyst and the air supply portion, at least the air supply portion may protrude from the exhaust passage laterally outward thereof. With this configuration, the secondary air valve (air supply portion) is hardly subjected to heat from the exhaust passage, and is readily cooled by the outside air. As a result, the operation of the secondary air valve is stabilized.

In the present invention, the pipe member may be detachably attached to an exhaust port of a cylinder head. With this configuration, the engine can be configured compactly, and also, assembly thereof is facilitated. In addition, the exhaust structure of the engine of the present invention can be applied to an existing engine.

In the present invention, the catalyst unit may include an exhaust gas sensor which is attached to the pipe member and detects a component in the exhaust gas. The exhaust gas sensor is, for example, an oxygen sensor for detecting the oxygen concentration in the exhaust gas. The exhaust gas sensor may be provided upstream or downstream of the catalyst, or may be provided both upstream and downstream thereof. With this configuration, the air-fuel ratio can be controlled so that fuel adjustment and reaction of the catalyst become normal.

An exhaust structure of an engine according to a first aspect of the present invention includes the catalyst unit of the present invention and to which a muffler is detachably attached, wherein the catalyst unit is provided upstream of the muffler. With this configuration, as described above, consideration for the catalyst and the secondary air valve is rendered to be easy for the manufacturer for the engine, and the degree of freedom in muffler specifications is improved.

An exhaust structure of an engine according to a second aspect of the present invention includes: a muffler detachably attached thereto; a catalyst which is provided upstream of the muffler and purifies exhaust gas; and a secondary air valve which is provided upstream of the catalyst and supplies air to an exhaust passage, wherein the catalyst and the secondary air valve are integrally unitized to form a catalyst unit.

In this configuration, the catalyst and the secondary air valve are integrally unitized and are attached between the engine and the muffler. Therefore, it is possible to consider the catalyst and the secondary air valve irrespective of the arrangement of the muffler. Thus, consideration for the catalyst and the secondary air valve is rendered to be easy for the manufacturer for the engine. In addition, the manufacturer for the working machine can arrange the muffler without considering arrangements of the catalyst and the secondary air valve, and therefore, the degree of freedom in muffler specifications is improved.

An exhaust structure of an engine according to a third aspect of the present invention includes: a muffler detachably attached thereto; a catalyst which is provided upstream of the muffler and purifies exhaust gas; and a secondary air valve which is provided upstream of the catalyst and supplies air to an exhaust passage, wherein the catalyst and the secondary air valve are integrated with a cylinder head, to form a catalyst unit.

In this configuration, the catalyst and the secondary air valve are integrated with the cylinder head. Therefore, it is possible to consider the catalyst and the secondary air valve irrespective of the arrangement of the muffler. Thus, consideration for the catalyst and the secondary air valve is rendered to be easy for the manufacturer for the engine. In addition, the manufacturer for the working machine can arrange the muffler without considering arrangements of the catalyst and the secondary air valve, and therefore the degree of freedom in muffler specifications is improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views:

DESCRIPTION OF EMBODIMENTS

Figure 1:
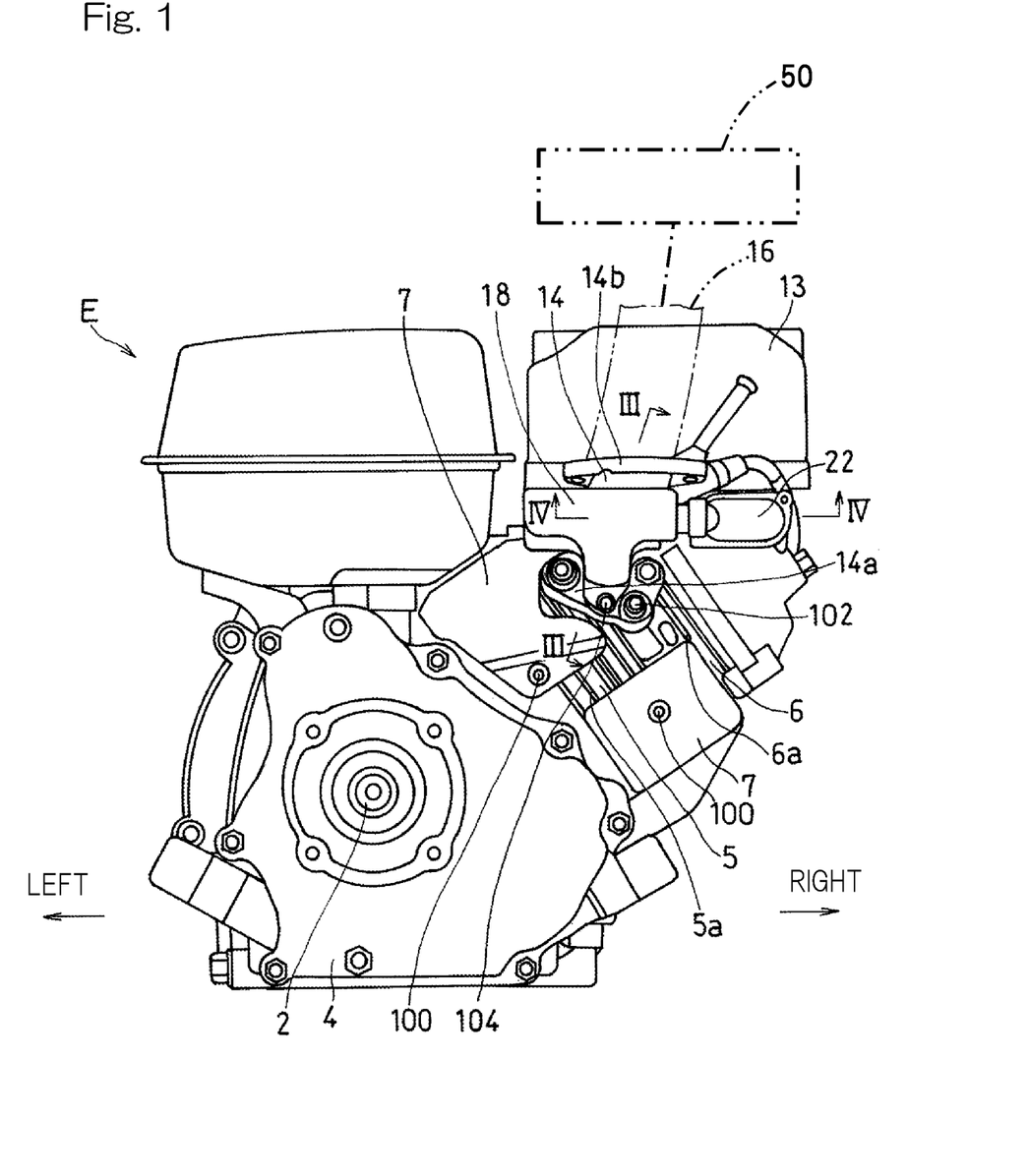
FIG. 1 is a front view showing an engine having an exhaust structure and a catalyst unit according to the first embodiment of the present invention.

Hereinafter, preferred embodiments of the present invention will be described with reference to the drawings. FIG. 1 is a front view of an engine having an exhaust structure according to the first embodiment of the present invention. An engine E of the present embodiment is an air-cooled single-cylinder 4-cycle engine having a rotary shaft extending in the horizontal direction, and is mounted to a ride-on-type lawn mower, for example. However, the type of the engine E is not limited thereto. The engine E may be mounted to a working machine other than a ride-on-type lawn mower.

As used herein, a "front-rear direction" refers to the axial direction of a crank shaft (rotary shaft) of the engine, and an "up-down direction" refers to a vertical direction in a state of being mounted to a ride-on-type lawn mower. In addition, a "left-right direction" refers to a direction perpendicular to both of the front-rear direction and the up-down direction.

The engine E shown in FIG. 1 includes a crank shaft 2 which is an engine rotary shaft, and an engine case 4 rotatably supporting the crank shaft 2. A cylinder 5 protrudes from an upper part on the right side of the engine case 4 obliquely upward toward the right side, and a cylinder head 6 is connected to the protruding end of the cylinder 5. Cooling fins 5a, 6a are formed on the outer surfaces of the cylinder 5 and the cylinder head 6. Parts that are likely to contact with an operator, of the outer peripheries of the cylinder 5 and the cylinder head 6, are covered with an engine cover 7. The engine cover 7 is fixed to the cylinder 5 and the cylinder head 6 by bolts 100.

Figure 2:
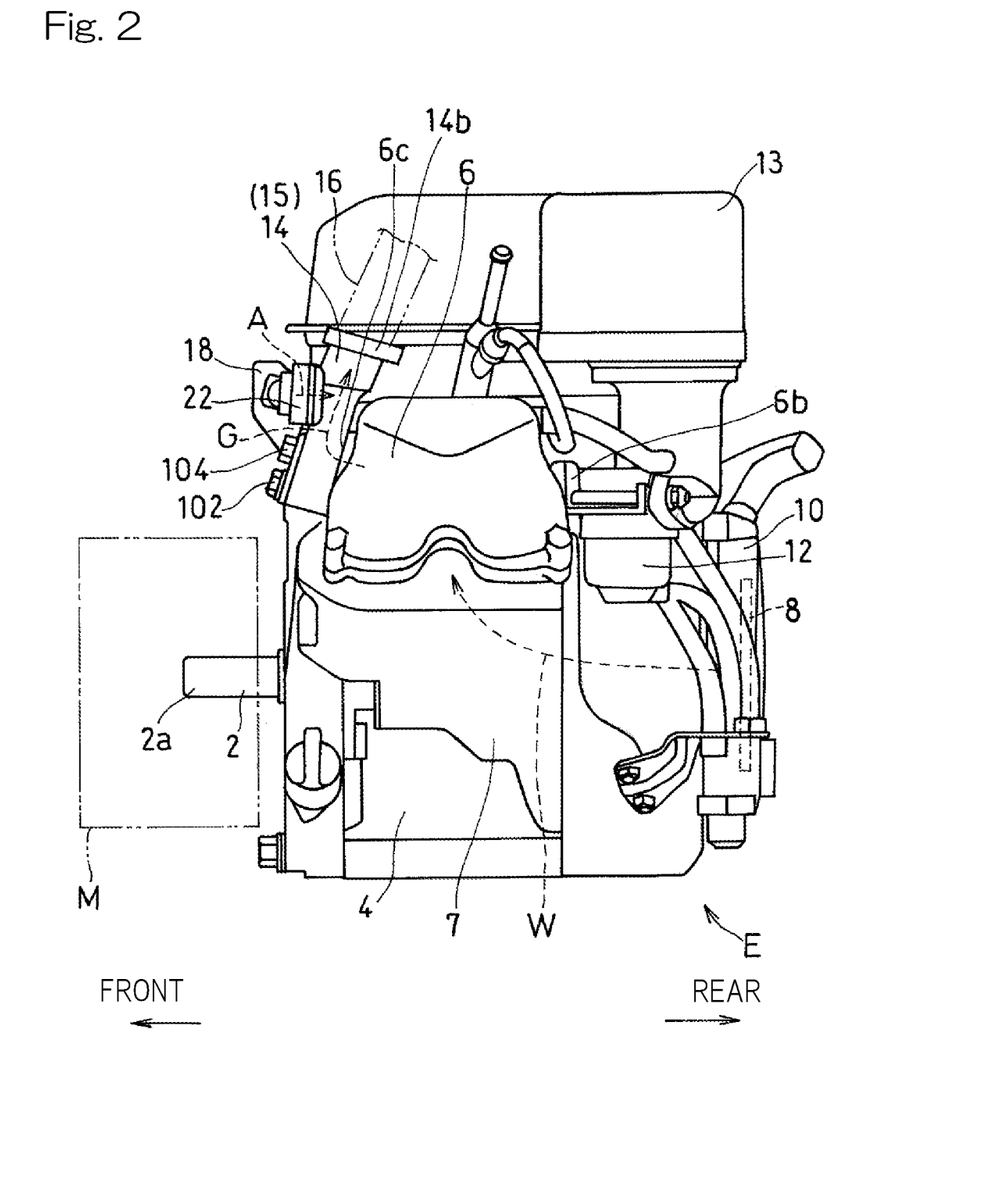
FIG. 2 is a side view showing the engine.

As shown in FIG. 2, a front end 2a of the crank shaft 2 protrudes from the engine case 4. A load (not shown) such as a working machine is connected to the front end 2a via a transmission M such that relative rotation therebetween is impossible. A centrifugal-type cooling fan 8, which also serves as a flywheel, is connected to the rear end of the crank shaft 2. The outer periphery of the cooling fan 8 is covered with a fan case 10. The fan case 10 is fixed to the engine case 4 by bolts (not shown). A cooling wind W generated by the cooling fan 8 is guided by the inner surfaces of the fan case 10 and the engine cover 7, so as to be supplied to the outer peripheries of the cylinder 5 and the cylinder head 6.

The engine of the present embodiment is a carburetor-type engine. That is, a carburetor 12, that mixes fuel and air to generate a mixture and sprays such a mixture into a combustion chamber in the cylinder 5, is connected to an intake port 6b defined at a rear part of the cylinder head 6. Clean air filtered by an air cleaner 13 is introduced into the carburetor 12. However, the engine E is not limited to a carburetor-type engine, and may be a fuel injection (FI) type engine. Meanwhile, a muffler 50 is connected to an exhaust port 6c defined at a front part of the cylinder head 6 via an exhaust pipe 14. That is, in the present embodiment, the exhaust pipe 14 constitutes a pipe member forming an exhaust passage 15 from the engine E. The muffler 50 muffles sound of exhaust gas G of the engine E.

Specifically, the exhaust pipe 14 has opposite ends provided with flanges 14a, 14b, and one flange 14a (upstream side flange) is detachably attached to the cylinder head 6 by bolts 102. Further, the muffler 50 is connected to the other flange 14b (downstream side flange) of the exhaust pipe 14 via a connection pipe 16. The muffler 50 may be directly connected to the exhaust pipe 14 without the connection pipe 16. The muffler 50 is, for example provided on the upper side or the right side of the engine E.

The exhaust pipe 14 is, for example, formed from a duct made of steel, and extends substantially upward from the exhaust port 6c of the cylinder head 6. The outer periphery of the exhaust pipe 14 is covered with an exhaust pipe cover 18. The exhaust pipe cover 18 covers the front side of the exhaust pipe 14, i.e., a side thereof opposite to the cylinder head 6. The exhaust pipe cover 18 is attached to the flange 14b of the exhaust pipe 14 by bolts 104. The exhaust pipe cover 18 may be formed so as to guide the cooling wind W to the muffler 50.

Figure 3:
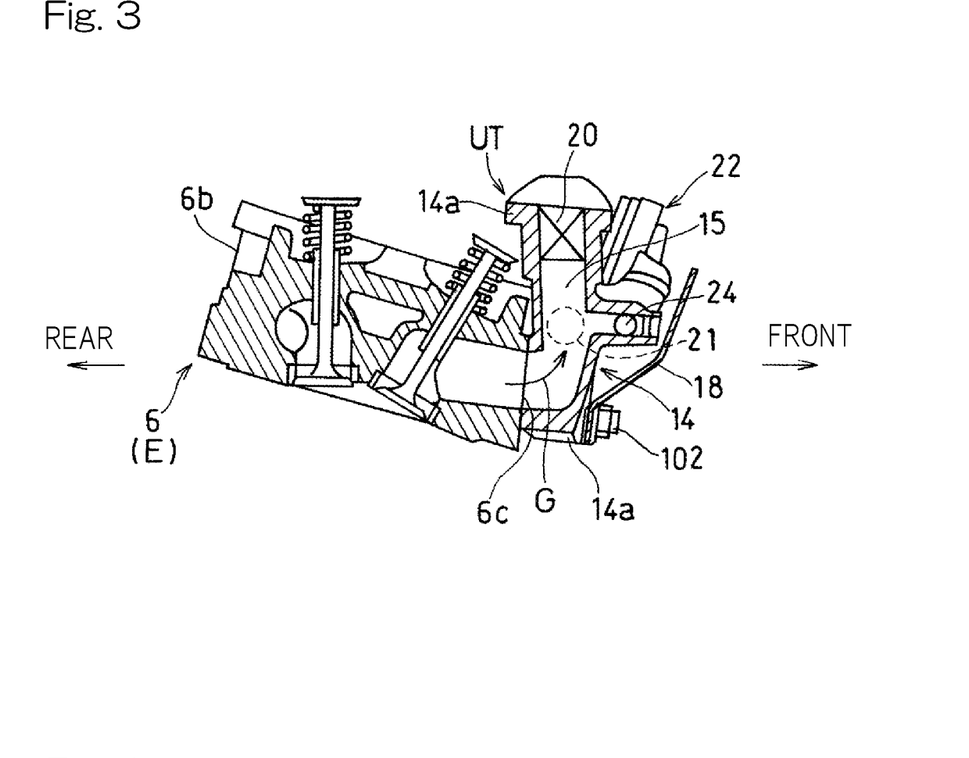
FIG. 3 is a sectional view along line III-III in FIG. 1.

As shown in FIG. 3, a catalyst 20 is provided in the exhaust passage 15 inside the exhaust pipe 14. That is, the catalyst 20 is provided upstream of the muffler 50. The catalyst 20 purifies the exhaust gas G flowing through the exhaust passage 15. The catalyst 20 in the present embodiment is a metal mesh catalyst. The metal mesh catalyst 20 is formed such that a catalyst is supported on the surface of a sintered metal mesh. Using the metal mesh catalyst 20 allows the catalyst 20 to be easily inserted into the exhaust pipe 14 from the outside, thus improving the degree of freedom in designing. However, the catalyst 20 is not limited thereto, and may be a metal honeycomb catalyst, for example.

Figure 4:
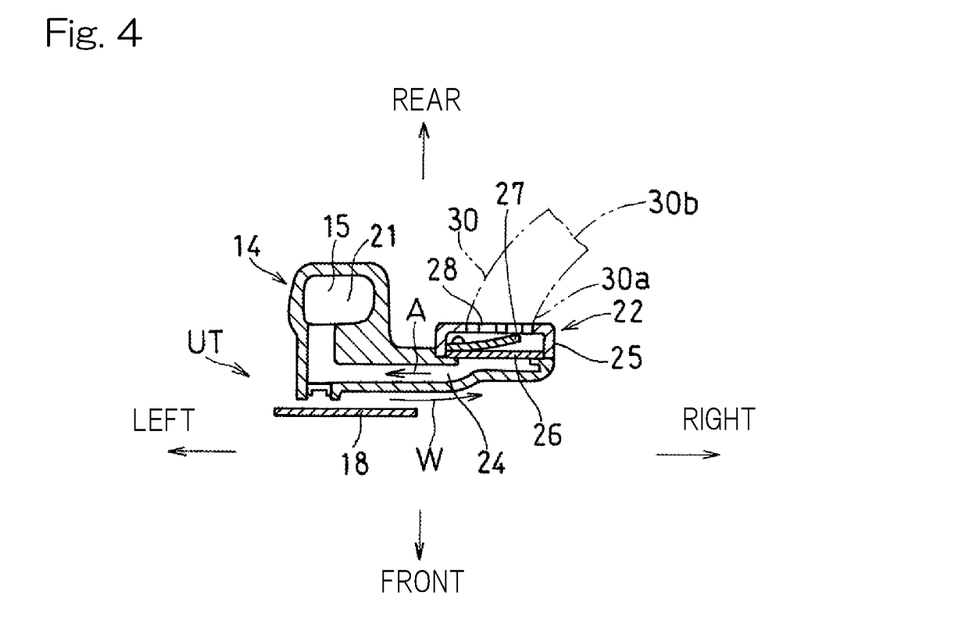
FIG. 4 is a sectional view along line IV-IV in FIG. 1.

An air mixing chamber 21 is formed upstream of the catalyst 20 in the exhaust pipe 14. A secondary air valve 22 is provided to the exhaust pipe 14. The secondary air valve 22 is provided upstream of the catalyst 20 on the exhaust pipe 14, and as shown in FIG. 2, supplies air A into the air mixing chamber 21 of the exhaust passage 15. That is, in the air mixing chamber 21, exhaust gas and the outside air A are mixed. Specifically, as shown in FIG. 4, a secondary air introducing passage 24 communicating with the air mixing chamber 21 of the exhaust passage 15 is formed in the exhaust pipe 14, and the secondary air valve 22 is provided at the upstream end of the secondary air introducing passage 24. The secondary air introducing passage 24 extends frontward (leftward in FIG. 2) from the exhaust passage 15, then bends and extends toward the right side, and is opened rearward. At such an opening defined at the secondary air introducing passage 24, the secondary air valve 22 is provided.

As shown in FIG. 1, the secondary air valve 22 is detachably attached to the exhaust pipe 14 by tightening members (not shown) such as bolts. That is, in the present embodiment, the exhaust pipe 14, the catalyst 20 and the secondary air valve 22 are integrally unitized to form a catalyst unit UT. The catalyst unit UT is detachably attached to the exhaust port 6c of the cylinder head 6 shown in FIG. 2. In the present embodiment, the front side of the secondary air introducing passage 24 of the exhaust pipe 14 shown in FIG. 3 is covered with the exhaust pipe cover 18.

The secondary air valve 22 operates depending on change in the pressure within the exhaust passage 15 of the exhaust pipe 14, so as to suck air into the exhaust passage 15. The secondary air valve 22 in the present embodiment has a case 25 and a reed valve 26 accommodated in the case 25 shown in FIG. 4. The reed valve 26 is a type of one-way valve, and is formed from a thin elastic plate (e.g., steel plate) with one end fixed, and the other end thereof opens only in one direction. A stopper piece 27 for suppressing excessive deformation of the reed valve 26 is overlaid on the reed valve 26.

The upstream side of the secondary air valve 22 is opened to the atmosphere. Specifically, an opening 28 is formed upstream of the reed valve 26 in the secondary air valve 22, and one end 30a of a hose 30 for air introduction is connected to such an opening 28. The other end 30b of the hose 30 is opened to the atmosphere. The other end 30b of the hose 30 may be connected to the air cleaner 13. The shapes of the engine cover 7, the exhaust pipe cover 18 and the like may be arranged so that the cooling wind W is introduced to the opening 28 of the secondary air valve 22.

Preferably, the opening 28 of the secondary air valve 22 is formed so that dust (lawn scrap, etc.) or muddy water hardly enters. For example, the opening 28 of the secondary air valve 22 may be provided on the upper side of the exhaust pipe 14. In addition, a mesh for catching dust may be provided to the opening 28 of the secondary air valve 22. Further, it is preferable to adopt a structure that prevents water from being stored inside the secondary air valve 22. For example, even in the case where the opening 28 is provided on the upper side of the exhaust pipe 14, the inlet of the hose 30 is preferably arranged so as not to face upward. In addition, a drainage hole may be provided to the secondary air valve 22.

Preferably, the cooling wind W contacts with the pipe periphery and the body of the secondary air valve 22. In the present embodiment, the front side of the secondary air introducing passage 24 of the exhaust pipe 14 is covered with the exhaust pipe cover 18 (FIG. 2), whereby the cooling wind W is supplied to the pipe periphery and the body of the secondary air valve 22.

As shown in FIG. 4, in the present embodiment, a part where the secondary air valve 22 is stored in the catalyst unit UT protrudes from the exhaust passage 15 laterally outward thereof (rightward in FIG. 4). In the present embodiment, the protrusion length of the secondary air valve 22 is set to about 60 mm. If the protrusion length of the secondary air valve 22 is excessively great, the size of the exhaust pipe cover 18 for supplying the cooling wind W to the secondary air valve 22 increases. If the protrusion length of the secondary air valve 22 is excessively small, the secondary air valve 22 interferes with the exhaust pipe 14.

The cooling wind W may or may not be guided to the catalyst 20 shown in FIG. 3. The cooling wind W flowing to the catalyst 20 can suppress afterburn. However, in terms of enhancing reaction of the catalyst 20, it is desirable that the cooling wind W does not flow to the catalyst 20. Whether or not to introduce the cooling wind W to the catalyst 20 is determined in consideration of balance between suppression of occurrence of afterburn and reaction of the catalyst 20.

Operation of the exhaust structure of the engine in the present embodiment will be described. When the engine E is started, the exhaust gas G is introduced to the exhaust passage 15 in the exhaust pipe 14 from the exhaust port 6c of the cylinder head 6 shown in FIG. 3. The exhaust gas G introduced to the exhaust passage 15 is purified by the catalyst 20, and then is, after having muffled by the muffler 50, discharged to the outside. At this time, with increase in the pressure within the exhaust passage 15 shown in FIG. 4, the reed valve 26 of the secondary air valve 22 is opened, so that air A is supplied from the hose 30 to the air mixing chamber 21 in the exhaust passage 15. Thus, harmful components contained in the exhaust gas G react with oxygen in the air A, so as to be removed.

In the above configuration, the catalyst 20 and the air mixing chamber 21 are provided in the exhaust pipe 14, and the secondary air valve 22 is attached to the exhaust pipe 14, thus forming a subassembly. As described above, since the catalyst unit UT including the catalyst 20 and the secondary air valve 22 forms a subassembly, attachment thereof to the engine E is facilitated.

The catalyst unit UT integrated as described above is attached between the engine E and the muffler 50. Therefore, it is possible to consider the catalyst 20 and the secondary air valve 22 irrespective of the arrangement of the muffler 50. Thus, consideration for the catalyst 20 and the secondary air valve 22 is rendered to be easy for the manufacturer for the engine. In addition, the manufacturer for the working machine can arrange the muffler 50 without considering arrangements of the catalyst 20 and the secondary air valve 22, and therefore, the degree of freedom in muffler specifications is improved. Since the secondary air valve 22 is formed from the reed valve 26, the structure is simplified.

Since the catalyst 20 is a metal mesh catalyst, the catalyst 20 can be easily inserted into the exhaust pipe 14 from the outside, and thus, the degree of freedom in designing is improved.

The catalyst unit UT including the catalyst 20 and the secondary air valve 22 is detachably attached to the exhaust port 6c of the cylinder head 6. Thus, the engine E can be configured compactly, and also, assembly thereof is facilitated. In addition, the exhaust structure of the engine in the present invention can be easily applied to an existing engine.

The part where the secondary air valve 22 is stored in the catalyst unit UT shown in FIG. 4 protrudes from the exhaust passage 15 laterally outward thereof. Thus, the secondary air valve 22 is hardly subjected to heat from the exhaust pipe 14, and is readily cooled by the outside air. As a result, the operation of the secondary air valve 22 is stabilized.

Figure 5:
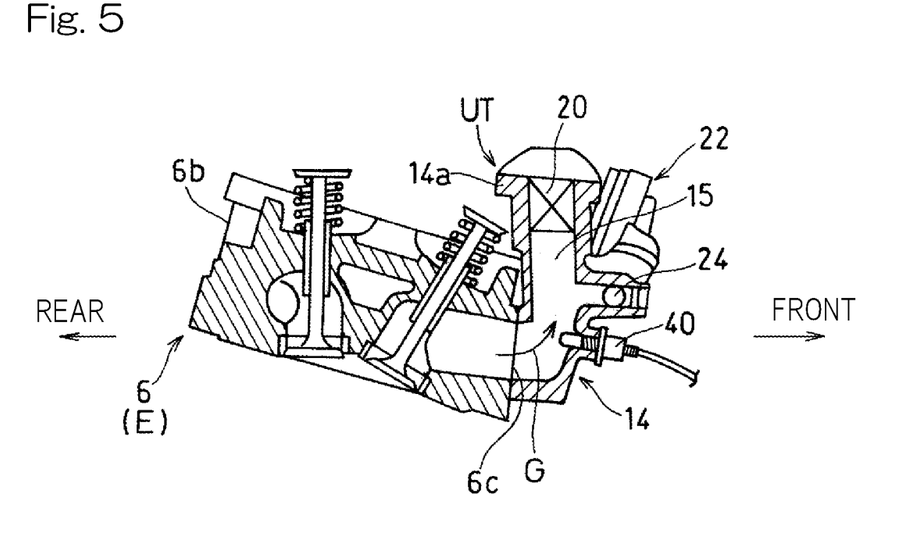
FIG. 5 is a sectional view showing a modification of the exhaust structure of the engine.

As shown in a modification in FIG. 5, an exhaust gas sensor 40 for detecting a component in exhaust gas G may be attached to the exhaust pipe (pipe member) 14. The exhaust gas sensor 40 is, for example, an oxygen sensor for detecting the oxygen concentration in the exhaust gas G. In the present embodiment, the exhaust gas sensor 40 is provided upstream of the catalyst 20. The exhaust gas sensor 40 may be provided downstream of the catalyst 20, or may be provided both upstream and downstream of the catalyst 20. A signal detected by the exhaust gas sensor 40 is outputted to a control device (not shown) for the engine, for example.

In the modification shown in FIG. 5, the control device for the engine controls the air-fuel ratio on the basis of a signal detected by the exhaust gas sensor 40. Thus, the air-fuel ratio can be controlled so that fuel adjustment and reaction of the catalyst 20 become normal. In addition, in the case where the exhaust gas sensor 40 is provided downstream of the catalyst 20, the deterioration condition of the catalyst 20 can be determined, whereby ease of maintenance is improved.

Figure 6:
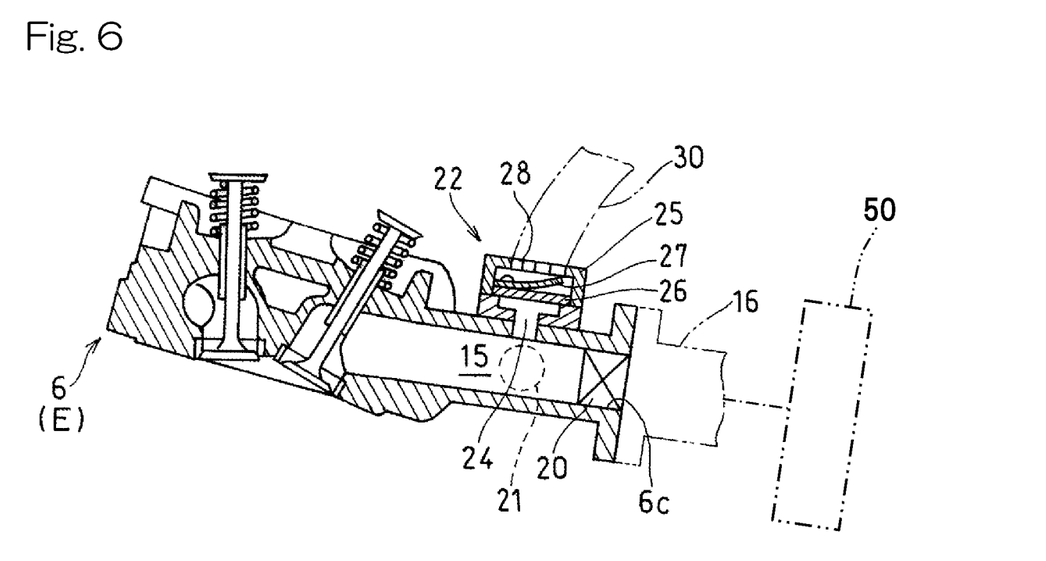
FIG. 6 is a vertical sectional view showing an exhaust structure according to the second embodiment of the present invention.

FIG. 6 is a vertical sectional view of an exhaust structure according to the second embodiment of the present invention. In the first embodiment, the catalyst 20 and the secondary air valve 22 are integrally unitized and thus are detachably attached to the exhaust port 6c, whereas in the second embodiment, the catalyst 20 and the secondary air valve 22 are integrated with the cylinder head 6. That is, in the first embodiment, the catalyst unit UT including the catalyst 20 and the secondary air valve 22 is provided separately from the cylinder head 6, whereas in the second embodiment, the catalyst unit UT is formed integrally with the cylinder head 6. As described above, in the second embodiment, a part of the cylinder head 6 constitutes a pipe member forming the exhaust passage 15 from the engine E.

In the second embodiment, the catalyst 20 is provided at the downstream end (outlet end) inside the exhaust port 6c, and the secondary air valve 22 is provided on the upstream side thereof. In the example shown in FIG. 6, the secondary air valve 22 is connected to the upper surface of the exhaust port 6c. A muffler 50 is detachably attached to the exhaust port 6c directly or via an exhaust pipe. The other configurations are the same as those in the first embodiment.

In the second embodiment, the catalyst 20 and the secondary air valve 22 are integrated with the cylinder head 6. Therefore, it is possible to consider the catalyst 20 and the secondary air valve 22 irrespective of the arrangement of the muffler 50. Thus, consideration for the catalyst 20 and the secondary air valve 22 is rendered to be easy for the manufacturer for the engine. In addition, the manufacturer for the working machine can arrange the muffler 50 without considering arrangements of the catalyst 20 and the secondary air valve 22, and therefore, the degree of freedom in muffler specifications is improved.

The present invention is not limited to the above embodiments, and numerous additions, changes, or deletions can be made without departing from the gist of the present invention. For example, in the above embodiments, the air-cooled horizontal-shaft engine has been described, but the catalyst unit and the exhaust structure of the present invention can be applied also to a vertical-shaft engine and a water-cooled engine. In addition, in the above embodiments, the single-cylinder engine has been described, but the catalyst unit and the exhaust structure of the present invention can be applied also to a multi-cylinder engine such as a two-cylinder V engine, for example. In the case of application to a multi-cylinder engine, the catalyst 20 and the secondary air valve 22 may be provided for each cylinder, or only one set of them may be provided to a manifold pipe. Providing them for each cylinder results in a great effect in terms of exhaust gas regulations. On the other hand, providing only one set to a manifold pipe can achieve a low-cost configuration.

The exhaust pipe 14 may be a straight pipe or may be an L-shaped pipe. Since the transmission M of the working machine and the like are provided around the front end 2a of the crank shaft 2 of the engine E shown in FIG. 2, a muffler cannot be provided there. In particular, in the case of V engine, the exhaust pipe 14 is often bent shortly after the exhaust pipe outlet, in consideration of interference with the body of the working machine or the ground. In the above embodiments, the pipe member is formed as a part of the exhaust pipe 14 in the exhaust structure of the engine E. However, the pipe member may be formed separately from the exhaust pipe 14. In the case where the pipe member is formed separately from the exhaust pipe 14, for example, the pipe member can be connected to the downstream end of the exhaust pipe 14 or can be interposed at an intermediate position of the exhaust pipe 14, and thus, it is possible to provide the pipe member at any position without changing the design of the entire structure in accordance with the structure of the engine E. Therefore, such a configuration is also included in the scope of the present invention.

REFERENCE NUMERALS

6 . . . cylinder head
6c . . . exhaust port
14 . . . exhaust pipe (pipe member)
15 . . . exhaust passage
20 . . . catalyst (metal mesh catalyst)
21 . . . air mixing chamber
22 . . . secondary air valve (air supply portion)
26 . . . reed valve
40 . . . exhaust gas sensor (oxygen sensor)
50 . . . muffler
A . . . air
E . . . engine
G . . . exhaust gas
UT . . . catalyst unit

What is claimed is:

1. A catalyst unit comprising:
a pipe member forming an exhaust passage from an engine and including a connection portion to which a muffler is connected;
a catalyst which is provided in the pipe member and purifies exhaust gas;
an air mixing chamber which is formed upstream of the catalyst in the pipe member and in which the exhaust gas and outside air are mixed;
an air supply portion which is stored in the pipe member and supplies the outside air to the air mixing chamber;
a part, where the air supply portion is stored in the pipe member, that protrudes from the exhaust passage laterally outward; and
a cover for fitting to a cylinder and a cylinder head of the engine and which supplies a cooling wind to the air supply portion, the cover being configured such that the cooling wind is guided to the catalyst.

2. The catalyst unit as claimed in claim 1, wherein the air supply portion is a secondary air valve, which operates depending on change in a pressure within the exhaust passage of the pipe member.

3. The catalyst unit as claimed in claim 1, wherein the catalyst is a multilayer metal mesh catalyst.

4. The catalyst unit as claimed in claim 1, wherein the pipe member is detachably provided upstream of the muffler.

5. The catalyst unit as claimed in claim 1, wherein the pipe member is detachably attached to an exhaust port of the cylinder head.

6. The catalyst unit as claimed in claim 1, further comprising an exhaust gas sensor which is attached to the pipe member and detects a component in the exhaust gas.

7. An exhaust structure of an engine comprising the catalyst unit as claimed in claim 1 and to which the muffler is detachably attached, wherein
the catalyst unit is provided upstream of the muffler.

8. The catalyst unit as claimed in claim 1, wherein the catalyst includes:
a multilayer sintered metal mesh; and
the catalyst is supported on a surface of the multilayer sintered metal mesh, and is inserted into the pipe member from the outside.

9. The catalyst unit as claimed in claim 1, wherein
the pipe member includes a first portion which is connected to the cylinder head of the engine, and
the air mixing chamber is disposed downstream of the first portion of the pipe member.

10. The catalyst unit as claimed in claim 1, wherein
the pipe member, the catalyst and the air supply portion are integrally unitized to form a sub-unit, the sub-unit being detachably attached to an exhaust port of the cylinder head of the engine.

11. An exhaust structure of an engine to which a muffler is detachably attached, comprising:
a catalyst which is disposed upstream of the muffler and purifies exhaust gas;
a secondary air valve which is disposed upstream of the catalyst and supplies air to an exhaust passage;
an air mixing chamber disposed upstream of the catalyst in the exhaust passage, the exhaust gas and the air supplied from the secondary air valve being mixed in the air mixing chamber; and
a cover which supplies a cooling wind to the secondary air valve, the cover being configured such that a cooling wind is guided to the catalyst, wherein
the catalyst and the secondary air valve are integrally unitized to form a catalyst unit,
apart of the secondary air valve protrudes from the exhaust passage laterally outward, and
the cover is fitted to a cylinder and a cylinder head of the engine.

12. The exhaust structure of the engine as claimed in claim 11, further comprising a pipe member forming the exhaust passage, and wherein the catalyst includes:
a multilayer sintered metal mesh; and
the catalyst is supported on a surface of the multilayer sintered metal mesh, and is inserted into the pipe member from the outside.

13. The exhaust structure of the engine as claimed in claim 11, further comprising a pipe member forming the exhaust passage, and wherein the catalyst is inserted into the pipe member from a downstream end of the pipe member, and is detachably fitted to the pipe member.

14. The exhaust structure of the engine as claimed in claim 11, further comprising:
a pipe member forming the exhaust passage from the engine and include a connection portion to which the muffler is detachably attached; and
a secondary air introducing passage communicating with the air mixing chamber in the exhaust passage and being separate from the air mixing chamber, the air being supplied from the secondary air valve to the air mixing chamber via the secondary air introducing passage, wherein
the catalyst is inserted into the pipe member from the outside, and
the exhaust passage, the air mixing chamber, the secondary air introducing passage, and the connection portion including the catalyst therein are formed in the single pipe member.

15. An exhaust structure of an engine to which a muffler is detachably attached, comprising:
a catalyst which is disposed upstream of the muffler and purifies exhaust gas;
a secondary air valve which is disposed upstream of the catalyst and supplies air to an exhaust passage;
an air mixing chamber formed upstream of the catalyst in the exhaust passage, the exhaust gas and the air supplied from the secondary air valve being mixed in the air mixing chamber;
a secondary air introducing passage communicating with the air mixing chamber in the exhaust passage and being separate from the air mixing chamber, via the secondary air introducing passage the air from the secondary air valve being supplied to the air mixing chamber; and
a cover which supplies a cooling wind to the secondary air valve, the cover being configured such that the cooling wind is guided to the catalyst, wherein
the catalyst and the secondary air valve are integrated with a cylinder head, to form a catalyst unit,
a part of the secondary air valve protrudes from the exhaust passage laterally outward, and
the cover is fitted to a cylinder and a cylinder head of the engine.

16. The exhaust structure of the engine as claimed in claim 15, further comprising a pipe member forming the exhaust passage, and wherein the catalyst includes:
a multilayer sintered metal mesh; and
the catalyst is supported on a surface of the multilayer sintered metal mesh, and is inserted into the pipe member from the outside.

17. The exhaust structure of the engine as claimed in claim 15, further comprising a pipe member forming the exhaust passage, wherein the catalyst is inserted into the pipe member from a downstream end of the pipe member, and is detachably fitted to the pipe member.

* * * * *